United States Patent [19]

Shibahata et al.

[11] Patent Number: 5,135,071
[45] Date of Patent: Aug. 4, 1992

[54] POWER TRANSMITTING APPARATUS FOR FOUR-WHEEL-DRIVE MOTOR VEHICLE

[75] Inventors: Yasuji Shibahata; Shyoji Tokushima; Yoshinobu Ezure; Kazuhiko Shimada, all of Tochigi, Japan

[73] Assignee: Honda Giken Kogyo Kabushiki Kaisha, Tokyo, Japan

[21] Appl. No.: 462,384

[22] Filed: Jan. 9, 1990

[30] Foreign Application Priority Data

Jan. 11, 1989 [JP] Japan ................................. 1-4228
Apr. 19, 1989 [JP] Japan ................................. 1-99286
Apr. 24, 1989 [JP] Japan ................................. 1-104091

[51] Int. Cl.$^5$ ............................................ B60K 17/35
[52] U.S. Cl. ................................. 180/249; 180/245; 180/248; 475/86; 475/221; 475/249
[58] Field of Search ............... 180/247, 248, 249, 250, 180/245; 475/248, 249, 84, 86, 221, 252

[56] References Cited

U.S. PATENT DOCUMENTS

| | | | |
|---|---|---|---|
| 4,420,059 | 12/1983 | Suzuki | 180/248 |
| 4,497,218 | 2/1985 | Zaunberger | 74/665 T |
| 4,523,493 | 6/1985 | Weib | 475/248 |
| 4,681,180 | 7/1987 | Oyama et al. | 180/248 |
| 4,719,985 | 1/1988 | Zaiser | 180/248 |
| 4,735,110 | 4/1988 | Altenberg | 180/248 |
| 4,763,747 | 8/1988 | Muller | 475/249 |
| 4,779,699 | 10/1988 | Hatano | 475/249 |
| 4,840,246 | 6/1989 | Yamakawa | 180/247 |

FOREIGN PATENT DOCUMENTS

| | | |
|---|---|---|
| 3223102A1 | 2/1983 | Fed. Rep. of Germany . |
| 3901348A1 | 7/1989 | Fed. Rep. of Germany . |
| 0034232 | 2/1988 | Japan ................................. 180/249 |
| 0207731 | 8/1988 | Japan ................................. 180/248 |
| 1-182127 | 7/1989 | Japan . |
| 1-182128 | 7/1989 | Japan . |
| 1257000 | 9/1986 | U.S.S.R. .......................... 475/86 |

Primary Examiner—Charles A. Marmor
Assistant Examiner—Ann Boehler
Attorney, Agent, or Firm—Armstrong, Nikaido, Marmelstein, Kubovcik & Murray

[57] ABSTRACT

A power transmitting apparatus on a four-wheel-drive motor vehicle can distribute and transmit drive power from a power unit to front and rear drive road wheels such that the rotational speeds of the front and rear drive road wheels can differ from each other. The power transmitting apparatus includes a casing rotatable by the drive power from the power unit, an output shaft disposed in the casing, first and second planetary gear mechanisms disposed between the casing and the output shaft, the first and second planetary gear mechanisms comprising first and second ring gears fixed to an inner periphery of the casing, first and second sun gears aligned with the first and second ring gears, respectively, first and second planet gears meshing with the first ring and sun gears and the second ring and sun gears, respectively, and rotatable about their own axes and the ring gears, and a planet carrier coupled to the output shaft, the first and second planet gears being rotatably supported on the planet carrier, the first and second planetary gear mechanisms having different speed-changing ratios, one of the speed-changing ratios being selected such that the rear drive road wheels rotate faster than the front drive road wheels, first and second clutches coupled respectively to the first and second sun gears, respectively, for selectively holding the first and second sun gears nonrotatable thereby to enable the first and second planetary gear mechanisms to transmit the drive power, and a pair of variable-torque-transmitting clutches coupled to respective ends of the output shaft.

7 Claims, 10 Drawing Sheets

POWER TRANSMITTING APPARATUS FOR FOUR-WHEEL-DRIVE MOTOR VEHICLE

BACKGROUND OF THE INVENTION

1. Field of the Invention:

The present invention relates to an apparatus for transmitting the power of a power unit to front and rear drive road wheels of a four-wheel-drive motor vehicle, and more particularly to a power transmitting apparatus capable of transmitting the power of a power unit such that the rotational speed of rear drive road wheels of a four-wheel-drive motor vehicle is higher than the rotational speed of front road wheels of motor vehicle.

2. Description of the Relevant Art:

Efforts have been made to develop power transmitting apparatus for transmitting the power of a power unit on a four-wheel-drive motor vehicle such that the rear drive road wheels rotate at a higher speed than the front drive road wheels in order to increase the turning performance and high-speed stability of the motor vehicle.

For example, Japanese Laid-Open Patent Publication No. 1(1989)-182128, published on Jul. 20, 1989, discloses a power transmitting apparatus for use on a four-wheel-drive motor vehicle, which apparatus includes clutches associated respectively with left and right rear drive road wheels, for independently variably controlling the ratios at which the power from the engine is transmitted to the rear road wheels (hereinafter referred to as a "power transmitting ratio"), and a speed control device mounted on the propeller shaft which serves as a power transmitting path from the engine to the rear road wheels, for equalizing or increasing the average rotational speed of the rear road wheels to or higher than the average rotational speed of the front road wheels. When the motor vehicle runs straight ahead, the average rotational speeds of the front and rear road wheels are equalized to each other. When the motor vehicle makes a turn, the average rotational speed of the rear road wheels is increased higher than that of the front road wheels, and the power transmitting ratio of the outer rear road wheel on the turning circle is made greater than that of the inner rear road wheel on the turning circle, thereby increasing the turning performance of the motor vehicle.

The above power transmitting apparatus is shown in FIG. 11 of the accompanying drawings. The power of an engine 1 is transmitted from a transmission 202, a gear train 203, and a front differential 204 to front drive road wheels 205L, 205R. The engine power is also transmitted from the front differential 204 through a gear train 206, a propeller shaft member 207, a speed control device 215, a propeller shaft member 208, a gear train 209, and a rear differential 210 to rear drive road wheels 213L, 213R. The speed control device 215, which is disposed between the propeller shaft members 207, 208, comprises a speed-increasing gear train 216, a speed-equalizing clutch 217, and a speed-increasing clutch 218, each of the clutches 217, 218 being in the form of a hydraulic multiple-disc clutch. When the speed-equalizing clutch 217 is engaged (ON) and the speed-increasing clutch 218 is disengaged (OFF), the engine power is transmitted such that the rotational speeds of the front road wheels 205L, 205R and the rear road wheels 213L, 213R are substantially equalized to each other. Conversely, when the speed-equalizing clutch 217 is disengaged (OFF) and the speed-increasing clutch 218 is engaged (ON), the engine power is transmitted such that the rotational speed of the rear road wheels 213L, 213R is higher than that of the front road wheels 205L, 205R.

The disclosed power transmitting apparatus is however large and heavy since the speed control device 215 is provided separately from the rear differential 210. In addition, if the motor vehicle is braked while the rear road wheels are rotating faster than the front road wheels during a turn, the braking force applied to the front road wheels is transmitted to the rear road wheels, making it difficult to keep the motor vehicle stable during the turn. To eliminate this difficulty, the motor vehicle needs such a complex control arrangement which either switches from the four-wheel-drive mode to a two-wheel-drive mode or controls the clutch to slip thus reducing the transmission of the braking force.

SUMMARY OF THE INVENTION

It is an object of the present invention to provide a power transmitting apparatus for use on a four-wheel-drive motor vehicle, which apparatus is capable of appropriately distributing the drive power of a power unit to left and right drive road wheels, of transmitting the drive power such that the rotational speed of the rear drive road wheels is higher than that of the front drive road wheels, is compact as a whole, and lightweight.

Another object of the present invention is to provide a power transmitting apparatus for use on a four-wheel-drive motor vehicle, which apparatus, when an excessive braking force is applied to the front drive road wheels at the time of braking the motor vehicle while the rear drive road wheels are rotating faster than the front drive road wheels during a turn, can prevent the excessive braking force from being transmitted from the front drive road wheels to the rear drive road wheels without a complex control arrangement, so that the rear drive road wheels will not be locked by the excessive braking force.

Still another object of the present invention is to provide a power transmitting apparatus for use on a four-wheel-drive motor vehicle, which apparatus includes a structurally simple speed control unit for switching between a speed-equalizing mode and a speed-increasing mode and a simplified clutch control arrangement.

According to the present invention, there is provided a power transmitting apparatus for distributing drive power from a power unit on a four-wheel-drive motor vehicle to front and rear drive road wheels thereof, comprising a casing rotatable by the drive power from the power unit, an output shaft disposed in the casing, first and second planetary gear mechanisms disposed between the casing and the output shaft, the first and second planetary gear mechanisms comprising first and second ring gears fixed to an inner periphery of the casing, first and second sun gears aligned with the first and second ring gears, respectively, first and second planet gears meshing with the first ring and sun gears and the second ring and sun gears, respectively, and rotatable about their own axes and the ring gears, and a planet carrier coupled to the output shaft, the first and second planet gears being rotatably supported on the planet carrier, the first and second planetary gear mechanisms having different speed-changing ratios, one of the speed-changing ratios being selected such that the rear drive road wheels rotate faster than the front drive road wheels, first and second clutches coupled respectively to the first and second sun gears, respectively, for selectively holding the first and second sun gears nonrotatable thereby to enable the first and second planetary gear mechanisms to transmit the drive power, and a pair of variable-torque-transmitting clutches coupled to respective ends of the output shaft.

When the clutches for fixing the sun gears of the two planetary gear mechanisms against rotation are selectively engaged and disengaged, the drive power from the power unit can be transmitted to the road wheels such that the rotational speed of the rear drive road wheels is higher than that of the front drive road wheels. Since the two planetary gear mechanisms are disposed in the casing, the power transmitting apparatus is compact and lightweight.

If the clutch for increasing the rotational speed of the rear drive road wheels is composed of a clutch which can selectively be engaged and disengaged and a one-way clutch disposed in series with the clutch, then an excessive braking force is prevented from being applied to the rear drive road wheels when the motor vehicle is braked while the rear drive road wheels are rotating faster than the front drive road wheels during a turn.

If the clutch for increasing the rotational speed of the rear drive road wheels higher than that of the front drive road wheels comprises a clutch which can selectively be engaged and disengaged, and the clutch for equalizing the rotational speed of the rear drive road wheels to that of the front drive road wheels comprises a one-way clutch, then it is not necessary to control the speed-equalizing clutch, and switching between speed-equalizing and -increasing modes can be effected simply by controlling the speed-increasing clutch. Therefore, the speed-changing control arrangement is simplified.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

FIGS. 1 through 4 show a power transmitting apparatus for use on a four-wheel-drive motor vehicle in accordance with a first embodiment of the present invention.

Figure 1:
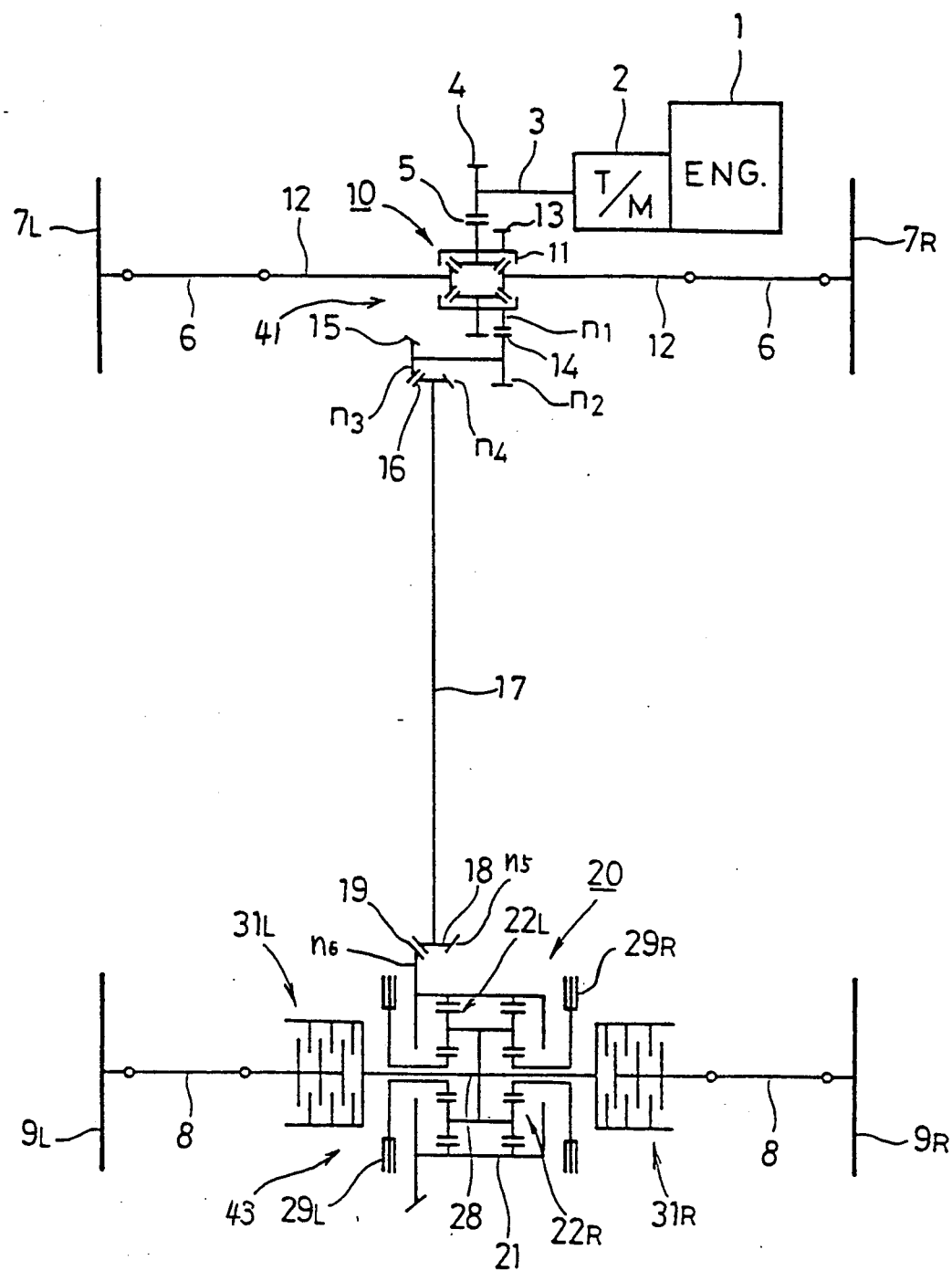
FIG. 1 is a schematic view of a power transmitting apparatus for use on a four-wheel-drive motor vehicle, according to a first embodiment of the present invention.

As shown in FIG. 1, the rotative power from a power unit or engine 1 is changed in speed by a transmission 2 and transmitted from an output shaft 3 thereof through gears 4, 5 to a differential case 11 of a front differential 10. The rotative power is then divided by the front differential 10 and transmitted from left and right shafts 12 thereof through respective drive axles 6 to left and right front drive road wheels 7L, 7R. The gears 4, 5, the front differential 10, and the drive axles 6 jointly serve as a front wheel power transmitting path 41.

The rotation of the differential case 11 is transmitted through gears 13, 14, 15, 16 to a propeller shaft 17, and then through gears 18, 19 to a casing 21 of a speed control device 20. The rotation is then controlled in speed by the speed control device 20 and transmitted from a common shaft 28 thereof through variable-torque-transmitting clutches 31L, 31R and drive axles 8 to left and rear drive road wheels 9L, 9R. The gears 13, 14, 15, 16, 18, 19, the propeller shaft 17, the speed control device 20, the clutches 31L, 31R, and the drive axles 8 jointly constitute a rear wheel power transmitting path 43.

Figure 2:
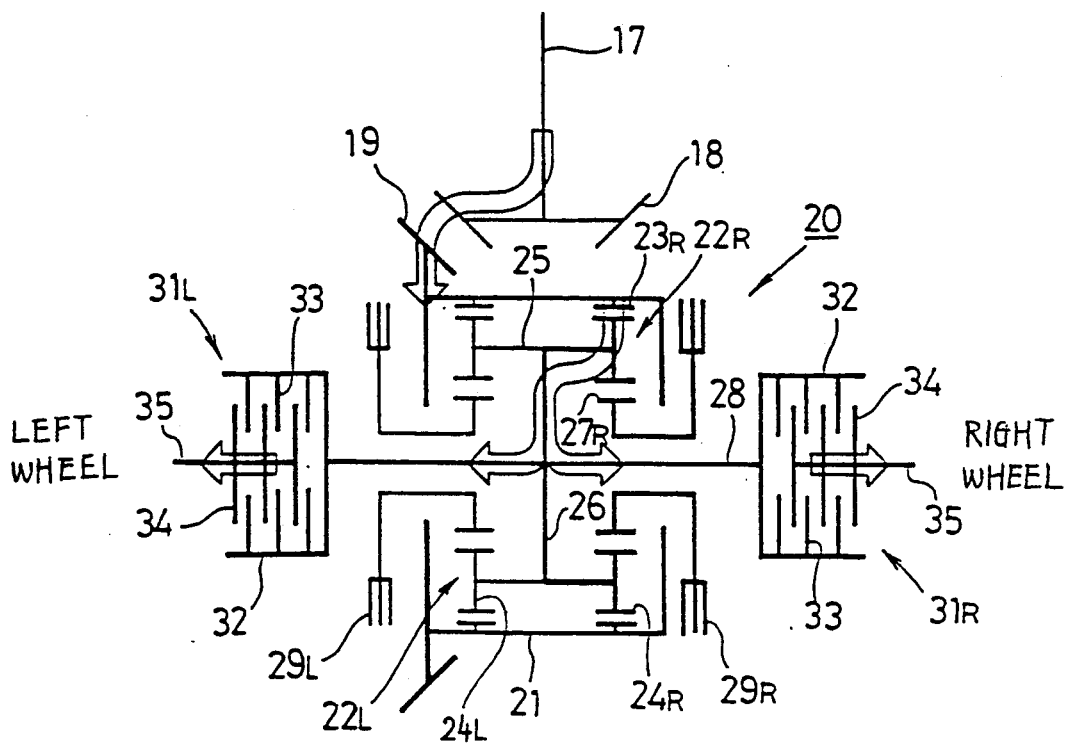
FIG. 2 is an enlarged schematic view of a portion of the power transmitting apparatus shown in FIG. 1, showing the parts position when the motor vehicle is running straight ahead.
Figure 3:
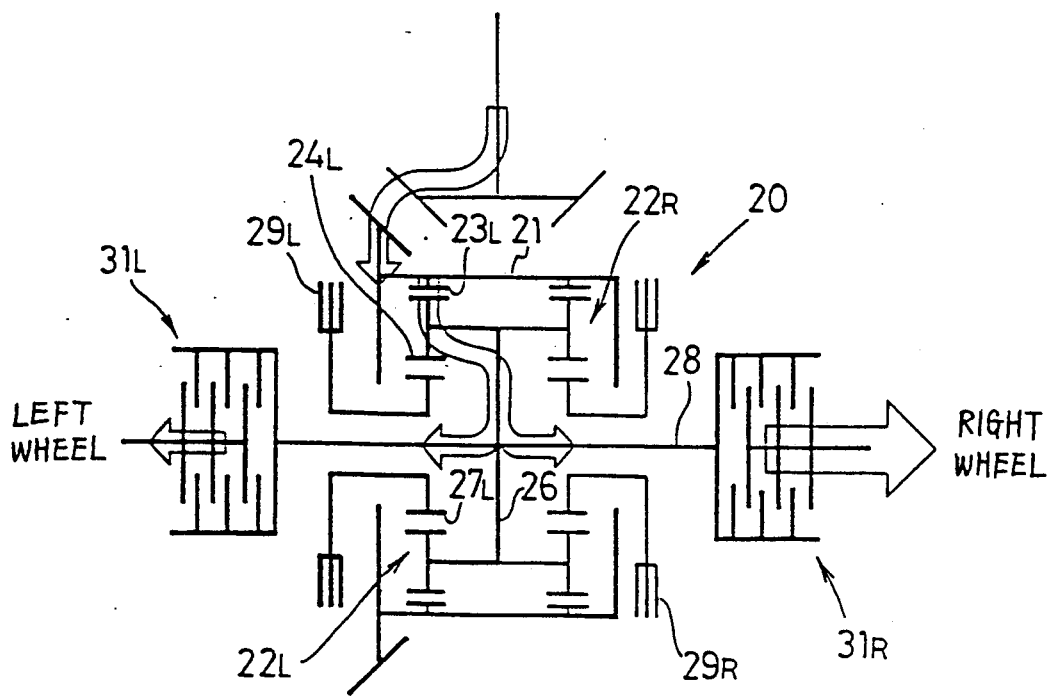
FIG. 3 is a view similar to FIG. 2, showing the parts position when the motor vehicle is making a turn.

The speed control device 20 is shown at enlarged scale in FIGS. 2 and 3. The speed control device 20 comprises the casing 21 which is tubular in structure, the common shaft 28 extending concentrically laterally through the casing 21, a pair of left and right planet gear mechanisms 22L, 22R, and a planet carrier 26.

The left and right planet gear mechanisms 22L, 22R comprise left and right ring gears 23L, 23R fixed to the inner peripheral surface of the casing 21, left and right sets of plural planet gears 24L, 24R meshing with the ring gears 23L, 23R and rotatable about their own axes and the common shaft 28, and left and right sun gears 27L, 27R rotatably mounted on the common shaft 28 and meshing with the planet gears 24L, 24R radially inwardly thereof. The planet gears 24L, 24R are rotatably supported on common shafts 25, which are supported on the planet carrier 26 that is fixedly coupled to the center of the common shaft 28.

The left and right sun gears 27L, 27R are coupled respectively to clutches 29L, 29R, respectively, for fixing the sun gears 27L, 27R against rotation. The clutches 29L, 29R can be controlled so that they are selectively engaged (ON) and disengaged (OFF). The clutches 29L, 29R are operated such that when one of them is engaged (ON), the other is disengaged (OFF).

The variable-torque-transmitting clutches 31L, 31R are interposed between left and right ends of the common shaft 28 and the drive axles 8. Each of the clutches 31L, 31R comprises a clutch casing 32 fixed to one end of the common shaft 28, a plurality of axially spaced outer plates 33 fixed to the inner peripheral surface of the clutch casing 32, and a plurality of axially spaced inner plates 34 disposed in interleaving relation to the outer plates 33 and mounted on a shaft 35. The shaft 35 is connected to one of the drive axles 8 (FIG. 1). The clutches 31L, 31R are hydraulically operable such that the engaging forces between the outer and inner plates 33, 34 are variable under hydraulic pressure.

The planetary gear mechanisms 22L, 22R of the speed control device 20 have different speed-changing ratios, one of which is selected to increase the rotational speed of the drive power to be transmitted to the rear road wheels 9L, 9R. One example of such speed-changing ratios of the planetary gear mechanisms 22L, 22R will be described below.

Since the clutches 29L, 29R are controlled such that when one of them is engaged or ON, the other is disengaged or OFF, the rotative drive power applied from the ring gears 23L, 23R is transmitted through one of the sets of the planet gears 24L, 24R which meshes with the fixed sun gear 27 coupled to the engaged planetary gear mechanism and also through the planet carrier 26 to the common shaft 28. The engaged planetary gear mechanism to which the fixed sun gear is coupled will now be analyzed.

Figure 4:
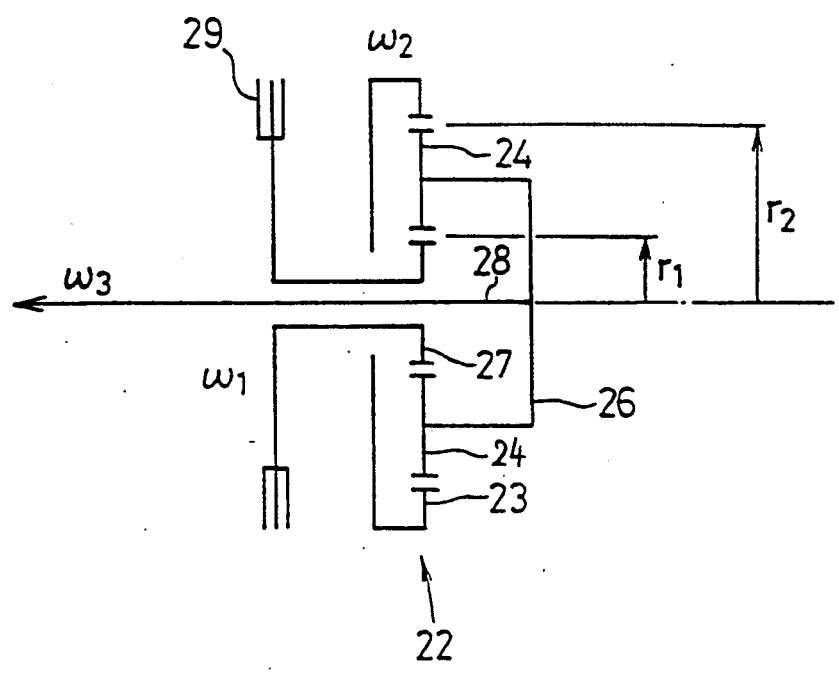
FIG. 4 is a schematic view illustrative of specifications of a planetary gear mechanism.

In FIG. 4, $\omega_1$ represents the rotational speed of the sun gear 27, $\omega_2$ the rotational speed of the ring gear 23, $\omega_3$ the rotational speed of the planet carrier 26, $r_1$ the radius of the pitch circle of the sun gear 27, and $r_2$ the radius of the pitch circle of the ring gear 23. These rotational speeds and radii satisfy the following equation:

$$\omega_1 = \frac{r_1 + r_2}{r_1} \omega_3 - \frac{r_2}{r_1} \omega_2 \quad (I)$$

Since the sun gear 27 is fixed against rotation by the clutch 29, the rotational speed of the sun gear 27 in the equation (I) is $\omega_1 = 0$. The ratio of the rotational speed $\omega_2$ of the ring gear 23 to the rotational speed $\omega_3$ of the planet carrier 26, i.e., the speed-changing ratio N, is given by:

$$N = \frac{\omega_2}{\omega_3} = \frac{r_1 + r_2}{r_2} \quad (II)$$

If the radii $r_1$, $r_2$ are selected such that the rotational speeds $n_1$, $n_2$, $n_3$, $n_4$, $n_5$, $n_6$ of the gears 13, 14, 15, 16, 18, 19 in FIG. 1 satisfy the following equation:

$$\frac{n_1}{n_2} \times \frac{n_3}{n_4} \times \frac{n_5}{n_6} \times \frac{r_1 + r_2}{r_2} = 1 \quad (III)$$

then the speed-changing ratio is substantially 1:1 where the front and rear road wheels are directly coupled to each other. This speed-changing ratio can be used when the motor vehicle runs straight.

If the radii $r_1$, $r_2$ are selected such that they satisfy the following equation:

$$\frac{n_1}{n_2} \times \frac{n_3}{n_4} \times \frac{n_5}{n_6} \times \frac{r_1 + r_2}{r_2} < 1 \quad (IV)$$

then the speed-changing ratio is such that the rotational speed of the rear road wheels is higher than the rotational speed of the front road wheels. This speed-changing ratio can be used when the motor vehicle makes a turn.

In FIGS. 2 and 3, the right planetary gear mechanism 22R, for example, is constructed such that it has the speed-changing ratio indicated by the equation (III), i.e., for driving the rear road wheels at the same speed as the front road wheels, and the left planetary gear mechanism 22L, for example, is constructed such that it has the speed-changing ratio indicated by the equation (IV), i.e., for increasing the rotational speed of the rear road wheels higher than the rotational speed of the front road wheels.

The mode in which the rear road wheels are directly coupled to, i.e., rotate at the same speed as, the front road wheels, and the mode in which the rear road wheels rotate at a speed higher than the front road wheels can be selected, one at a time, when one of the sun gears 27L, 27R is fixed against rotation and the other is allowed to rotate idly. Inasmuch as the torque required by the clutch 29 to fix the sun gear 27 is reduced to $r_1/r_2$ of the torque applied to the speed control device 20, the clutch 29 itself may be reduced in size and weight.

The speed control device 20 is controlled as follows:

The speed control device 20 has its parts positioned as shown in FIG. 2 when the motor vehicle is running straight. The right clutch 29R is engaged to fix the sun gear 27R of the direct-coupling, or speed-equalizing, planetary gear mechanism 22R, against rotation, and the clutch 29L is disengaged to allow the sun gear 27L of the speed-increasing planetary gear mechanism 22L to rotate. At this time, the same hydraulic pressure is supplied to the left and right torque-distributing clutches 31L, 31R so that equal drive power will be applied to the left and right rear road wheels.

Therefore, as indicated by the thicker arrows, the rotative power applied from the propeller shaft 17 through the gears 18, 19 to the casing 21 of the speed control device 20 is transmitted from the ring gear 23R through the planet gears 24R of the right speed-equalizing planetary gear mechanism 22R with the fixed sun gear 27R to the planet carrier 26 and hence the common shaft 28. At this time, no rotative power is transmitted from the left planet gears 24L to the planet carrier 26 as the sun gear 27L of the left speed-increasing planetary gear mechanism 22L is idly rotating.

When the motor vehicle runs straight, therefore, the rotative power is transmitted to the front and rear road wheels such that the rotational speed of the front road wheels 7L, 7R and the rotational speed of the rear road wheels 9L, 9R are substantially equalized to each other at the ratio of 1:1 by the speed-equalizing planetary gear mechanism 22R. Because of this action, and also due to the equal distribution of the drive power through the variable-torque-transmitting clutches 31L, 31R, the motor vehicle can run straight highly stably, especially at high speeds.

The parts of the speed control device 20 when the motor vehicle is making a turn are positioned as shown in FIG. 3. The left clutch 29L is engaged to fix the sun gear 27L of the speed-increasing planetary gear mechanism 22L, and the right clutch 29R is disengaged to release the sun gear 27R for idle rotation. If the turn is a left turn, then a higher hydraulic pressure is applied to the right variable-torque-transmitting clutch 31R, which is coupled to the outer rear road wheel 9R on the turning circle, than to the left variable-torque-transmitting clutch 31L, which is coupled to the inner rear road wheel 9L on the turning circle, so that greater drive power is transmitted to the right rear road wheel 9R.

Inasmuch as the sun gear 27L of the left speed-increasing planetary gear mechanism 22L is fixed against rotation, when the casing 21 is rotated, the planet gears 24L are rotated about their own axes and the common shaft 28, and the rotative power is transmitted from the ring gear 23L and the planet gears 24L to the planet carrier 26 and hence to the common shaft 28.

When the motor vehicle makes a turn, therefore, the rotative power is transmitted to the front and rear road wheels such that the rear road wheels 9L, 9R are rotated faster than the front road wheels 7L, 7R by the speed-increasing planetary gear mechanism 22R. This action, together with the fact that the greater drive power is transmitted to the outer rear road wheel 9R by the clutches 31L, 31R, permits the motor vehicle to have increased turning performance.

The variable-torque-transmitting clutches 31L, 31R may be controlled such that it increases the rotational speed of the inner road wheel and applies greater drive power to the inner road wheel when the motor vehicle makes a turn at high speed.

While the speed control device 20 is disposed coaxially with the rear road wheels 9L, 9R in the above embodiment, it may be positioned coaxially with the front road wheels 7L, 7R or coaxially with the propeller shaft 17 between the front and rear road wheels.

The sun gears 27L, 27R may be fixedly coupled to the common shaft 28, the two sets of planet gears 24L, 24R may be supported independently by respective planet carriers, and these planet carriers may be selectively fixed against rotation independently by respective clutches.

The present invention is also applicable to a four-wheel-drive motor vehicle which is exactly the reversal of the four-wheel-drive motor vehicle shown in FIG. 1, i.e., in which the rear road wheels 9L, 9R serve as front road wheels and the front road wheels 7L, 7R serve as rear road wheels.

A power transmitting apparatus for use on a four-wheel-drive motor vehicle according to a second embodiment of the present invention will be described below with reference to FIGS. 5 through 7. In the second embodiment, one-way clutches are disposed between the sun gears of the planetary gear mechanisms and the variable-torque-transmitting clutches in the speed control device of the first embodiment.

Figure 5:
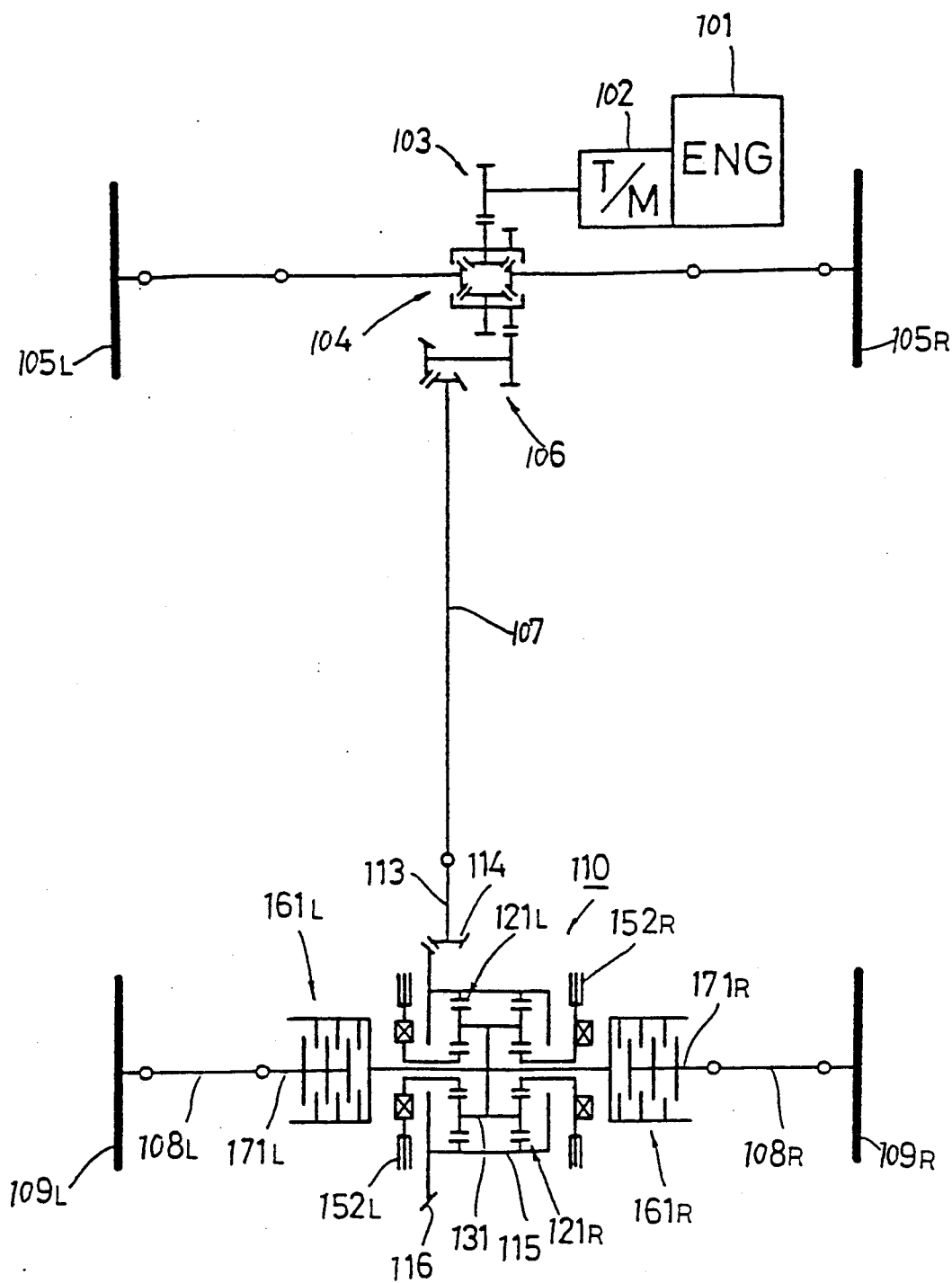
FIG. 5 is a schematic view of a power transmitting apparatus for use on a four-wheel-drive motor vehicle, according to a second embodiment of the present invention.

As shown in FIG. 5, the rotative power from a power unit or engine 101 is changed in speed by a transmission 102 and transmitted from an output shaft thereof through a gear train 103 to a differential 104 from which the power is transmitted to left and right front drive road wheels 105L, 105R. The rotative power is also transmitted from the differential 104 through a gear train 106 and a propeller shaft 107 to a speed control device 110.

Figure 6:
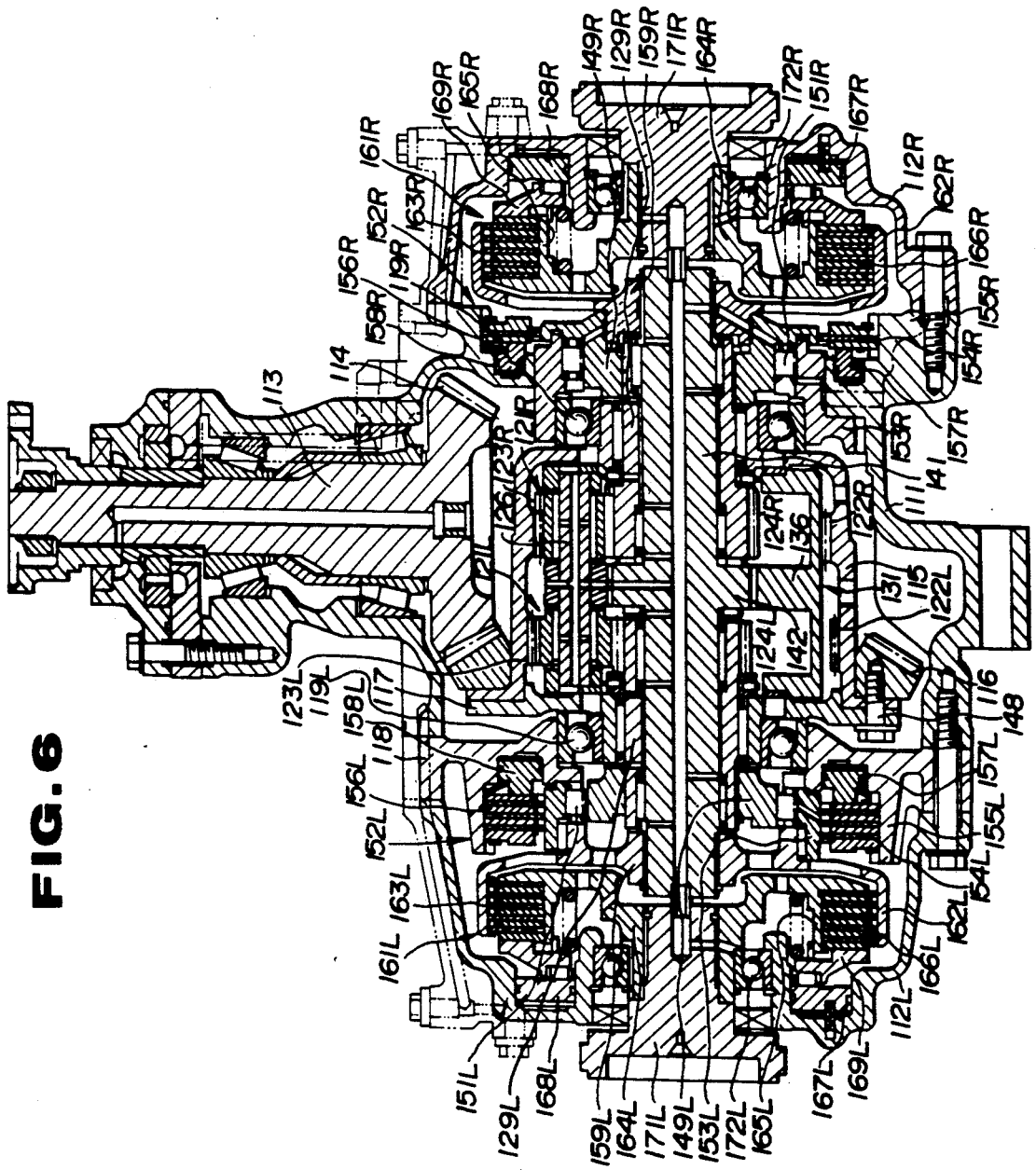
FIG. 6 is a cross-sectional view of a rear differential incorporating a speed control device in the power transmitting apparatus shown in FIG. 5.

In FIG. 6, the speed control device 110 includes a differential housing 111, a pair of left and right clutch housings 112L, 112R attached to the housing 111, an input shaft 113 rotatably supported in the housing 111, a bevel gear 114 integrally formed with the input shaft, a casing 115 disposed in the housing 111, a bevel gear 116 mounted on the casing 115 and meshing with the bevel gear 114, and a side cover 117 attached to the casing 115.

The input shaft 113 is coupled to the rear end of the propeller shaft 107. The rotative power from the propeller shaft 107 is transmitted through the input shaft 113 and the bevel gears 114, 116 to the casing 115. The casing 115 houses therein a pair of left and right planetary gear mechanisms 121L, 121R.

The planetary gear mechanisms 121L, 121R comprise a pair of left and right ring gears 122L, 122R fixed to the inner peripheral surface of the casing 115, two sets of planet gears 123L, 123R, and a pair of sun gears 124L, 124R. The planet gears 123L, 123R are rotatably supported by respective roller bearings 125L, 125R (FIG. 7) on a common pinion shaft 126 which is supported in a planet carrier 131 in the form of a unitary case.

Figure 7:
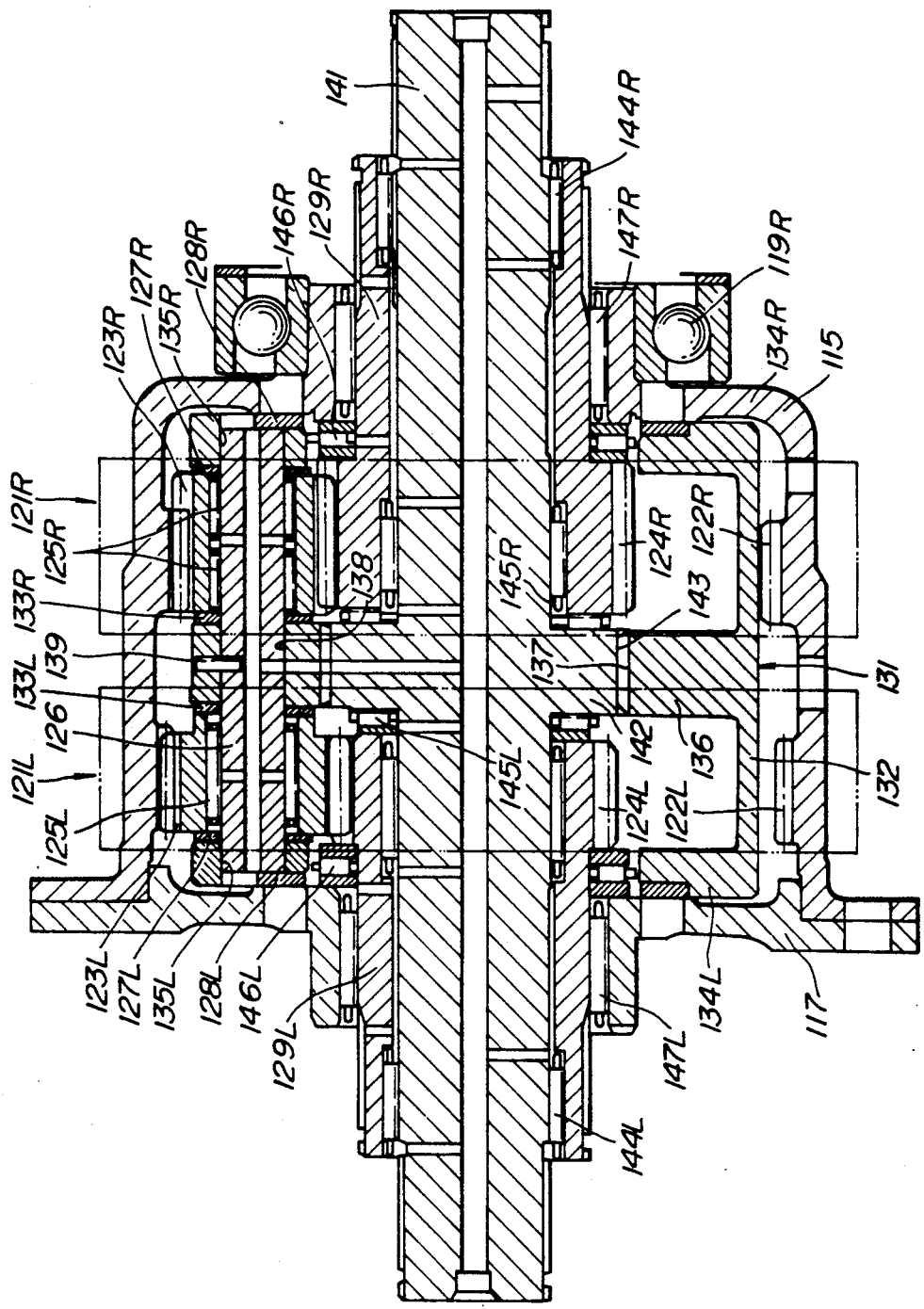
FIG. 7 is an enlarged cross-sectional view of planetary gear mechanisms of the speed control device.

As shown in FIG. 7, the planet carrier 131 includes a drum 132 which has left and right windows 133L, 133R in which the planet gears 123L, 123R are disposed, and shaft holes 135L, 135R defined in left and right walls 134L, 134R, respectively, and receiving the ends of the pinion shaft 126. The drum 132 also has an inward central flange 136 which has an inside diameter smaller than the inside diameters of the walls 134L, 134R. The inward flange 136 has splines 137 on its inner peripheral surface and also has a shaft hole 138 in which the pinion shaft 126 is supported.

A main shaft 141 disposed in the casing 115 has an integral outward central flange 142 with splines 143 formed on its outer peripheral surface, the splines 143 meshing with the splines 137 on the inward flange 136.

To assemble the planetary gear mechanisms 121L, 121R, the planet gears 123L, 123R are placed respectively in the windows 133L, 133R in the planet carrier 131, and thrust plates 127L, 127R and 133L, 133R are held against the ends of the planet gears 123L, 123R, respectively. The pinion shaft 126 is fitted into the shaft holes 135L, 138, 135R, with the roller bearings 125L, 125R placed within the planet gears 123L, 123R, respectively. The pinion shaft 126 is fixed in place to the planet carrier 131 by a central knock pin 139. Thrust plates 128L, 128R are held against the ends of the pinion shaft 126.

Tubular members 129L, 129R integral with the sun gears 124L, 124R are fitted over left and right end portions, respectively, of the main shaft 141 with roller bearings 144L, 144R interposed therebetween, and also with thrust bearings 145L, 145R interposed between the sun gears 124L, 124R and the outward flange 142. Thrust bearings 146L, 146R are then placed against outer sides of the sun gears 124L, 124R.

The inward flange 136 of the planet carrier 131 and the outward flange 142 of the main shaft 141 are coupled to each other through the meshing splines 137, 143. The assembly is then put into the casing 115, and the gears of the planetary gear mechanisms 121L, 121R are held in mesh with each other. The casing 115 in which the tubular members 129L, 129R are rotatably supported by roller bearings 147L, 147R, the side cover 117, and the bevel gear 116 are fastened together by bolts 148.

As with the first embodiment, the left and right planetary gear mechanisms 121L, 121R have different speed-changing ratios. The left planetary gear mechanism 121L serves as a speed-increasing planetary gear mechanism, whereas the right planetary gear mechanism 121R serves as a speed-equalizing planetary gear mechanism.

As shown in FIG. 6, flange members 149L, 149R are fitted over the outer ends, respectively, of the tubular members 129L, 129R through serrations. A one-way clutch 151L and a control clutch 152L are mounted on the outer periphery of the flange member 149L, and a one-way clutch 151R and a control clutch 152R are mounted on the outer periphery of the flange member 149R.

The left one-way clutch 151L is disposed between a flange member 149L and a tubular member 153L. When the flange member 149L rotates in one direction, the one-way clutch 151L connects the flange member 149L and the tubular member 153L to each other. When the flange member 149L rotates in the opposite direction, the one-way clutch 151L disconnects the flange member 149L and the tubular member 153L from each other. The right one-way clutch 151R is disposed between a flange member 149R and the housing 111. When the flange member 149R rotates in one direction, the one-way clutch 151R connects the flange member 149R and the housing 111 to each other. When the flange member 149R rotates in the opposite direction, the one-way clutch 151R disconnects the flange member 149R and the housing 111 from each other. Therefore, the one-way clutch 151L allows the flange member 149L to rotate only in one direction relatively to the tubular member 153L, whereas the one-way clutch 151R allows the flange member 149R to rotate only in one direction relatively to the housing 111.

The left control clutch 152L is disposed between the tubular member 153L and a clutch case 118 fixed to the housing 111, whereas the right control clutch 152R is disposed between the flange member 149R and the housing 111. The left control clutch 152L has friction plates which include inner plates 154L fitted over the tubular member 153L through serrations and outer plates 156L fitted in a clutch outer 155L of the clutch case 118 through serrations. The clutch case 118 has a cylinder 157L in which a piston 158L is slidably fitted. The right control clutch 152R has friction plates which include an inner plate 154R fitted over the flange member 149R through serrations and an outer plate 156R fitted in a clutch outer 155R of the housing 111 through serrations. The housing 111 has a cylinder 157R in which a piston 158R is slidably fitted.

The side cover 117 of the differential case 115 is supported on the clutch case 118 by a ball bearing 119L. The tubular member 153R disposed around the right one-way clutch 151R is fitted in the housing 111 by serrations. The differential case 115 is supported on the tubular member 153R by a ball bearing 119R.

The one-way clutch 151R and the control clutch 152R which is disposed parallel to the one-way clutch 151R jointly constitute a speed-equalizing clutch assembly, and the one-way clutch 151L and the control clutch 152L which is disposed in series with the one-way clutch 151L jointly constitute a speed-increasing clutch assembly.

Flange members 159L, 159R are fitted over the left and right ends of the main shaft 141 through serrations. Variable-torque-transmitting clutches 161L, 161R are interposed between the flange members 159L, 159R and output shafts 171L, 171R. The variable-torque-transmitting clutches 161L, 161R are identical to each other in construction. The variable-torque-transmitting clutches 161L, 161R have friction plates including outer plates 163L, 163R fitted in clutch outers 162L, 162R of the flange members 159L, 159R and inner plates 166L, 166R fitted through serrations over clutch inners 165L, 165R of flange members 164L, 164R which are fitted over the output shafts 171L, 171R through serrations. The clutch housings 112L, 112R have cylinders 167L, 167R with respective pistons 168L, 168R slidably fitted therein. Presser members 169L, 169R are interposed between the pistons 168L, 168R and the friction plates.

The output shafts 171L, 171R are rotatably supported in the clutch housings 112L, 112R, respectively, by respective ball bearings 172L, 172R, and are coupled to left and right drive axles 108L, 108R which are connected to rear drive road wheels 109L, 109R, respectively.

The speed control device 110 is mounted on the four-wheel-drive motor vehicle shown in FIG. 5. When the motor vehicle runs straight, the right control clutch 152R is disengaged (OFF) and the left control clutch 152L is also disengaged (OFF).

When the rotational speed of the front road wheels 105L, 105R is higher than that of the rear road wheels 109L, 109R, the one-way clutch 151R fixes the sun gear 124R of the speed-equalizing planetary gear mechanism 121R to the housing 111, thus transmitting the drive power to the rear road wheels 109L, 109R.

At this time, an equal hydraulic pressure is supplied to the cylinders 167L, 167R of the left and right variable-torque-transmitting clutches 161L, 161R to move the cylinders 168L, 168R out of the cylinders 167L, 167R for equalizing the forces with which the friction plates 163L, 166L and 163R, 166R engage. The drive powers supplied to the rear road wheels 109L, 109R can thus be equalized.

Therefore, the rotative power applied through the propeller shaft 107, the input shaft 113, and the bevel gears 114, 116 to the casing 115 is transmitted from the ring gear 122R to the main shaft 141 integral with the planet carrier 131 while the planet gears 123R of the right speed-equalizing planet gear mechanism 121R with the fixed sun gear 124R are revolving around the main shaft 141. The drive rotative power is equally distributed from the left and right ends of the main shaft 141 through the flange members 159L, 159R, the variable-torque-transmitting clutches 161L, 161R, and the flange members 164L, 164R to the output shafts 171L, 171R, which cause the drive axles 108L, 108R to rotate the left and right rear road wheels 109L, 109R at equal speeds. The motor vehicle now runs stably especially at high speed when it runs straight.

When the rotational speed of the front road wheels 105L, 105R is lower than that of the rear road wheels 109L, 109R, the sun gear 124R is held idle, thus cutting off the transmission of the drive power to the rear road wheels 109L, 109R. More specifically, when an excessive braking force is applied to the front road wheels 105L, 105R at the time the motor vehicle is braked, the excessive braking force is prevented from being transmitted to the rear road wheels 109L, 109R and hence locking the rear road wheels.

When an engine brake is applied to the rear road wheels 109L, 109R, i.e., when the rear road wheels 109L, 109R are forcibly rotated by the road surface, and when the motor vehicle is moved backwards or reversed, the one-way clutch 151R allows the sun gear 124R to rotate freely, thereby releasing the rear road wheels 109L, 109R. If the ear road wheels 109L, 109R are to be braked by an engine brake or the drive power is to be transmitted to the rear road wheels 109L, 109R when the motor vehicle is reversed, a hydraulic pressure is supplied to the cylinder 157R to move out the piston 158R to connect the friction plates 154R, 156R. The left control clutch 152R is now engaged (ON) to cause the flange member 149R and the tubular member 129R to fix the sun gear 124R of the speed-equalizing planetary gear mechanism 121R against rotation irrespective of the one-way clutch 151R, so that the braking force and the drive power can be transmitted to the rear road wheels 109L, 109R.

When the motor vehicle makes a turn, a hydraulic pressure is supplied to the cylinder 157L to move out the piston 158L to engage the left control clutch 152L. The sun gear 124L of the speed-increasing planetary gear mechanism 121L is fixed against rotation by the flange member 149L and the tubular member 129L. At the same time, the right control clutch 152R is disengaged. If the turn is a left turn, then a higher hydraulic pressure is applied to the right variable-torque-transmitting clutch 161R coupled to the outer rear road wheel on the turning circle than to the left variable-torque-transmitting clutch 161L coupled to the inner rear road wheel on the turning circle, so that greater drive power is distributed to the right rear road wheel 109R.

The rotative power of the casing 115 is transmitted from the ring gear 122L through the planet gears 123L of the left speed-increasing planetary gear mechanism 121L with the sun gear 124L fixed against rotation and also through the planet gear 131 to the main shaft 141. Since the sun gear 124R of the speed-equalizing planetary gear mechanism 121R is rotated in the opposite direction to that described above in response to the rotation of the planet carrier 131, the one-way clutch 131R is disengaged, and no power is transmitted from the planet gears 123R.

The speed-increased rotative power is transmitted to the right output shaft 171R and the speed-reduced rotative power is transmitted to the left output shaft 171L by the left and right variable-torque-transmitting clutches 161L, 161R. As a result, the right rear road wheel 109R rotates faster than the left rear road wheel 109L.

If the motor vehicle is braked while the rear road wheels are rotated at a higher speed during a turn, thus applying an excessive braking force to the front road wheels, the one-way clutch 151L is disengaged by the excessive braking force on the front road wheels, thereby cutting off the transmission of the excessive braking force from the front road wheels to the rear road wheels. Therefore, the one-way clutch 151L is effective to prevent the rear road wheels from being locked by the excessive braking force on the front road wheels, regardless of whether the control clutch 152L is controlled or not.

Since only the one-way clutch 151L prevents the rear road wheels from being locked due to the excessive braking force on the front road wheels while the rear road wheels are rotating faster during a turn, and also since the speed-increasing control clutch 152L is used only to switch between the speed-equalizing mode and the speed-increasing mode, the entire control arrangement is simplified.

A power transmitting apparatus for use on a four-wheel-drive motor vehicle according to a third embodiment of the present invention will hereinafter be described with reference FIG. 8. In the third embodiment, the sun gear of the speed-equalizing planetary gear mechanism of the speed control device according to the first embodiment is controlled by a one-way clutch which allows the sun gear to rotate only in one direction.

Figure 8:
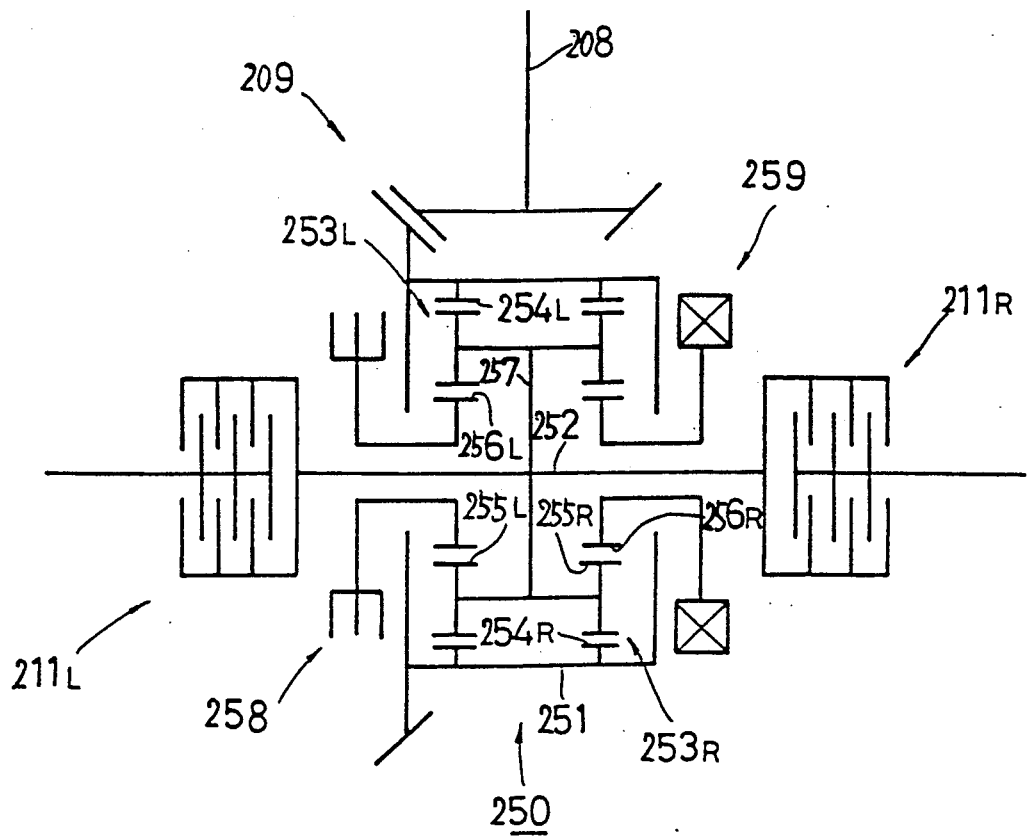
FIG. 8 is a schematic view of a rear differential having a speed control device according to a third embodiment of the present invention.

As shown in FIG. 8, a speed control device 250 includes a pair of left and right planetary gear mechanisms 253L, 253R is disposed between a casing 251 and a main shaft 252. The planetary gear mechanisms 253L, 253R comprise respective ring gears 254L, 254R disposed on the inner peripheral surface of the casing 251, two sets of plural planet gears 255L, 255R supported on a planet carrier 257 radially inwardly of the ring gears 254L, 254R and meshing with the ring gears 254L, 254R, and two sun gears 256L, 256R rotatably supported on the main shaft 252 radially inwardly of the planet gears 255L, 255R and meshing with the planet gears 255L, 255R.

The sun gear 256L of the speed-increasing planetary gear mechanism 253L can be fixed against rotation by a clutch 258 which can selectively be engaged (ON) and disengaged (OFF). The sun gear 256R of the speed-equalizing planetary gear 253R can be fixed against rotation by a one-way clutch 259 only while forward rotative power is being transmitted when the motor vehicle is not braked.

The speed control device 250 of the above structure is disposed in the path which transmits the drive power from the power unit of the four-wheel-drive motor vehicle shown in FIG. 1 to the rear drive road wheels thereof.

When the motor vehicle runs straight, the speed-increasing clutch 258 is disengaged. The rotation of the casing 251 is transmitted through the planet gears 255R and the planet carrier 257 of the speed-equalizing planetary gear mechanism 253R to the output shaft 252. At this time, left and right variable-torque-transmitting clutches 211L, 211R in a rear differential 210 which are coupled to the output shaft 252 are controlled such that their engaging forces are equal to each other.

When the motor vehicle makes a turn, the speed-increasing clutch 258 is engaged to transmit the rotative power through the planet gears 255L and the planet carrier 257 of the speed-increasing planetary gear mechanism 253L to the output shaft 252. At this time, the left and right variable-torque-transmitting clutches 211L, 211R are controlled such that greater drive power is applied to the outer rear road wheel on the turning circle.

The speed-increasing clutch 258 is a clutch which can selectively be engaged and disengaged. The speed-equalizing clutch 259 is however a one-way clutch. Since the one-way clutch is not required to be controlled, the speed-equalizing mode and the speed-increasing mode can be selected simply when only the speed-increasing clutch 258 is controlled. Therefore, the clutch control arrangement is much simpler than the arrangement shown in FIG. 11 which requires both speed-equalizing and -increasing clutches 217, 218 that have to be controlled.

Since the one-way clutch 259 is employed, the entire structure of the apparatus is simplified and reduced in size. As switching between the speed-equalizing and -increasing modes can smoothly be effected by the one-way clutch 259, any shock upon a speed change is reduced.

A speed control device disposed between propeller shaft members of a propeller shaft which interconnect a front wheel power transmitting mechanism and a rear wheel power transmitting mechanism will be described below.

Figure 10:
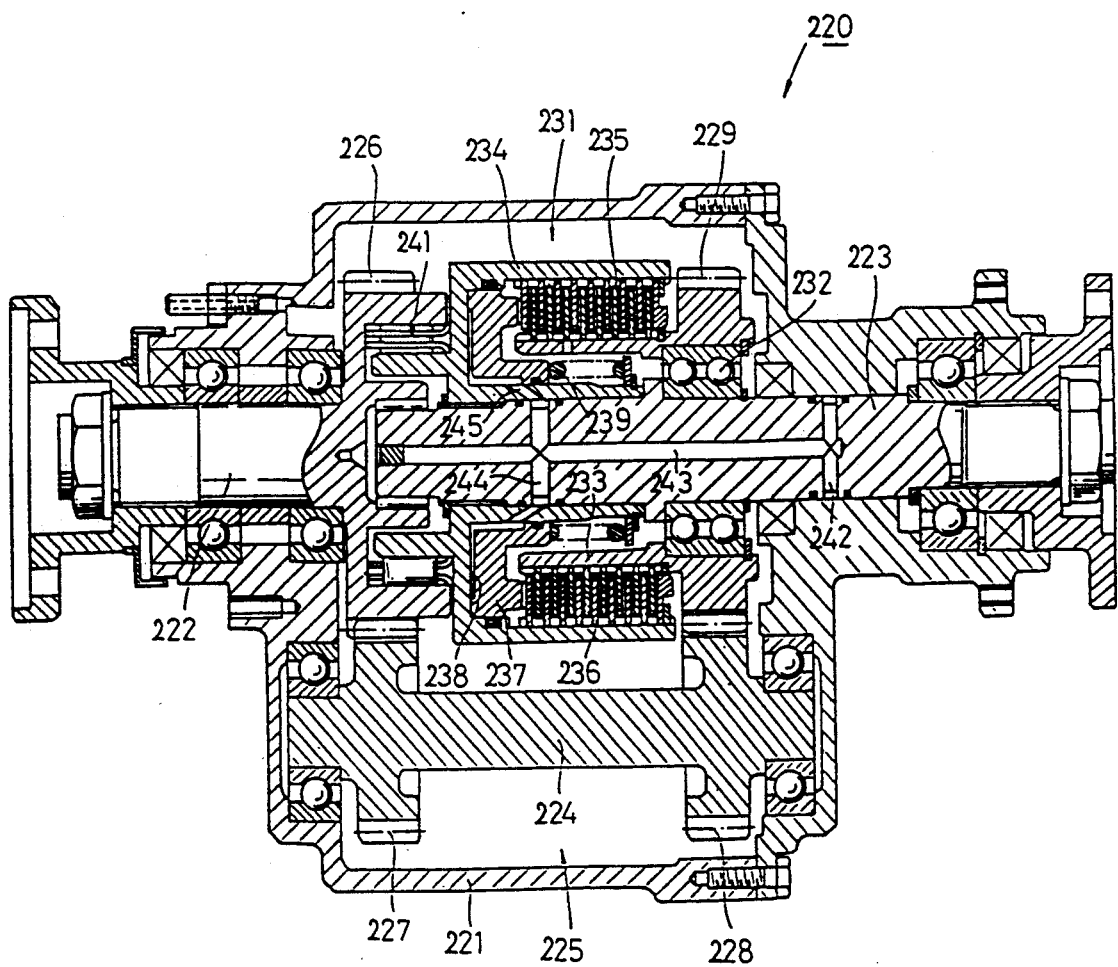
FIG. 10 is a cross-sectional view of the speed control device shown in FIG. 9.

As shown in FIG. 10, a speed-increasing gear mechanism 225 is disposed between input and output shafts 222, 223 and a countershaft 224. The speed-increasing gear mechanism 225 comprises a gear 226 integral with the rear end of the input shaft 222, gears 227, 228 integral with the countershaft 224 at front and rear ends thereof, and a gear 229 rotatably supported on the output shaft 223. A speed-increasing control clutch 231 in the form of a hydraulically operated multiple-disc clutch is disposed between the final gear 229 and the output shaft 223.

The control clutch 231 comprises a plurality of axially interleaving inner and outer plates 235, 236 which are fitted over an inner hub 233 integral with the final gear 229 and fitted in an outer hub 234 fitted over a front portion of the output shaft 223 by serrations or the like. The final gear 229 is rotatably mounted on an intermediate portion of the output shaft 223 by a ball bearing 232. The outer hub 234 has a piston 237 slidably fitted in a hydraulic pressure chamber 238 and biased by a return spring 239.

A one-way clutch 241 is disposed between the outer hub 234 of the control clutch 231 and the gear 226 on the rear end of the input shaft 222. The one-way clutch 241 serves to transmit rotative power from the input shaft 222 to the output shaft 223 when the motor vehicle runs straight, so that the front and rear road wheels rotate at the same speed.

The hydraulic pressure chamber 238 is supplied with working oil from an hydraulic pressure source (not shown) through an oil passage (not shown) defined in a case 221, a radial oil passage 242 defined in the output shaft 223, an axial oil passage 243 defined in the output shaft 223, a radial oil passage 244 defined in the output shaft 223, and an oblique oil passage 234 defined in a radially inner portion of the outer hub 234. The piston 237 is now moved to the right against the bias of the return spring 239 for pressing the inner and outer plates 235, 236 against each other into frictional engagement.

Figure 9:
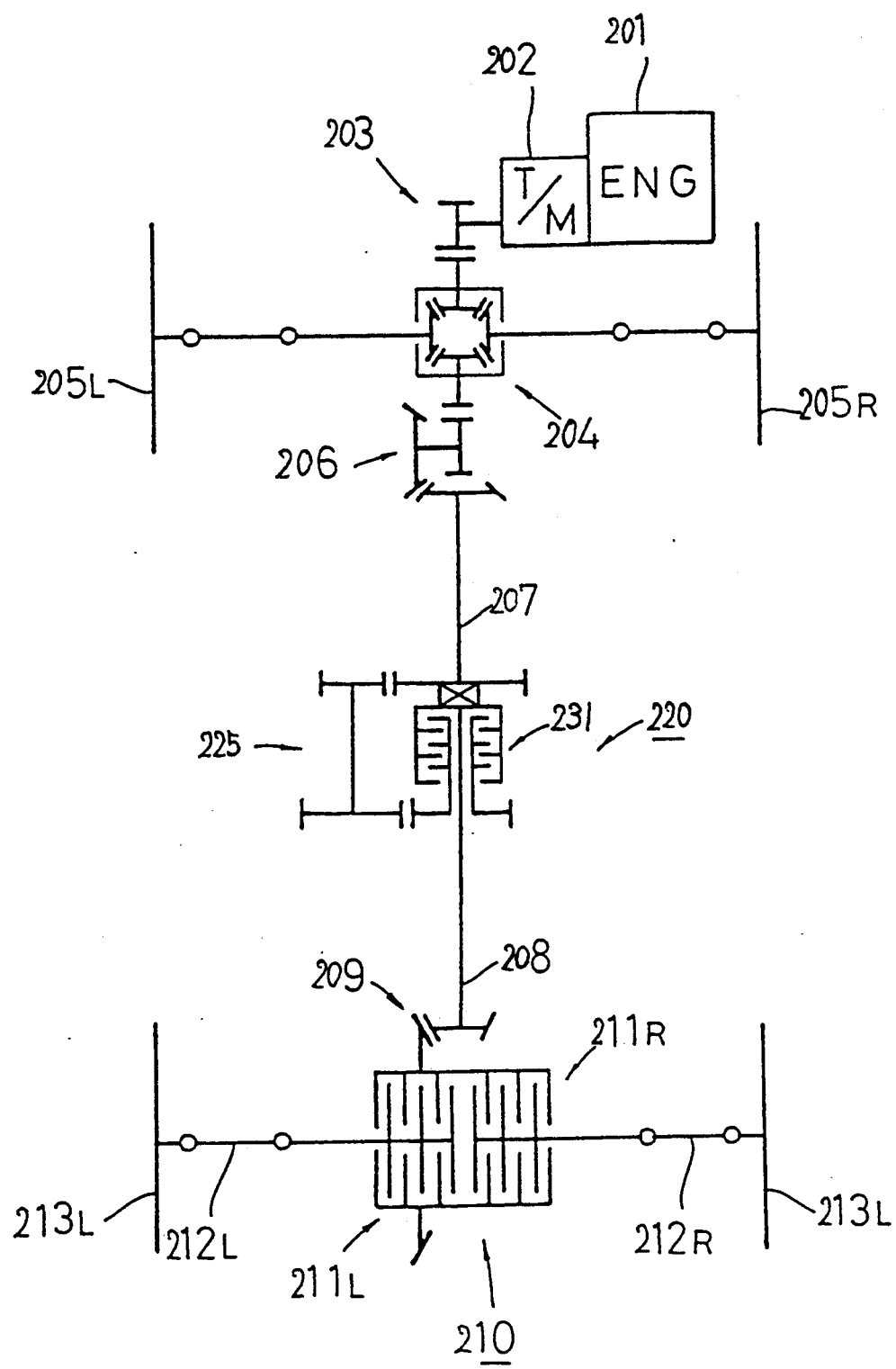
FIG. 9 is a schematic view of a power transmitting apparatus with a speed control device disposed on a propeller shaft.

The speed control device 220 thus constructed is disposed in the path which transmits the drive power from the power unit of a four-wheel-drive motor vehicle shown in FIG. 9 to rear drive road wheels thereof.

As shown in FIG. 9, the rotative power from the power unit or engine 201 is changed in speed by a transmission 202 and transmitted from an output shaft thereof through a gear train 203 to a differential 204 from which the power is transmitted to left and right front drive road wheels 205L, 205R. The rotative power is also transmitted from the differential 204 through a gear train 206, a propeller shaft member 207, the speed control device 220, a propeller shaft member 208, a gear train 209, a rear differential 210, drive axles 212L, 212R to rear drive road wheels 213L, 213R.

When the motor vehicle runs straight, the speed-increasing clutch 231 is disengaged. The rotation of the input shaft 222 is transmitted through the one-way clutch 241 and the outer hub 234 to the output shaft 223. When the motor vehicle makes a turn, the speed-increasing clutch 231 is engaged to transmit the rotative power through the input shaft 222, the gears 226, 227, 228, 229 and the clutch 231 to the output shaft 223.

Figure 11:
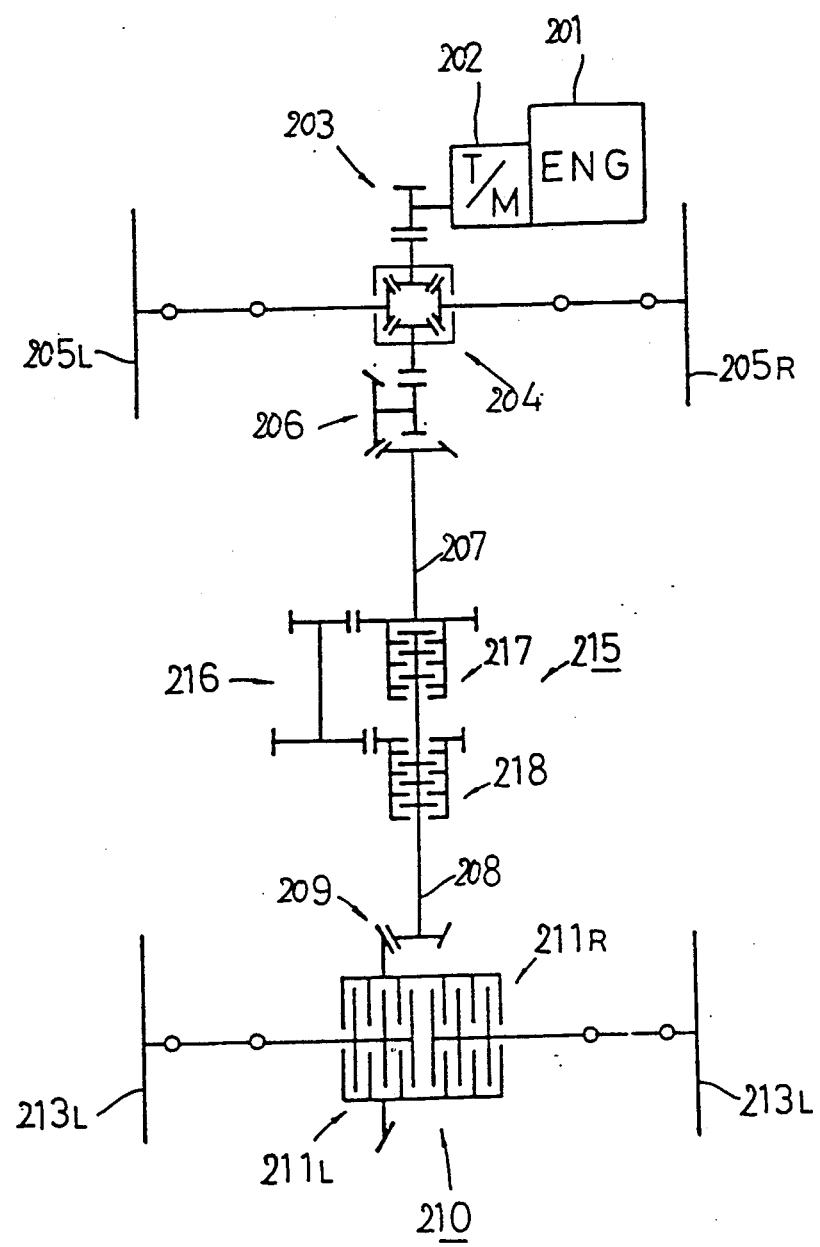
FIG. 11 is a schematic view of a power transmitting apparatus for use on a motor vehicle, which is relevant to the present invention.

The speed-changing control arrangement of the speed control device 220 is simpler than the arrangement shown in FIG. 11 which requires both speed-equalizing and -increasing clutches 217, 218.

With the present invention, as described above, a speed control device with two planetary gear mechanisms assembled in a casing is compact and lightweight. One of the two planetary gear mechanisms is constructed to have a speed-increasing gear ratio. When the clutches associated with the sun gears of the planetary gear mechanisms are selectively engaged and disengaged, speed-equalizing and -increasing modes can be selected one at a time for increased moving performance of a four-wheel-drive motor vehicle on which the speed control device is mounted. Two variable-torque-transmitting clutches associated with respective output shafts are controlled to distribute drive power to front and rear drive road wheels.

Another speed control device of the present invention has speed-increasing clutches which include a control clutch and a one-way clutch for transmitting drive power from front drive road wheels to rear drive road wheels. When an excessive braking force is applied to the front drive road wheels while the rear drive road wheels are rotating faster during a turn, the rear drive road wheels are prevented by the one-way clutch from being locked by the excessive braking force applied to the front drive road wheels, regardless of whether the control clutch is engaged or disengaged. The control arrangement for the clutches is therefore simplified.

Still another speed control device includes a speed-increasing control clutch which can selectively be engaged and disengaged and a speed-equalizing one-way clutch. Switching between speed-equalizing and -increasing modes can be effected only by controlling the speed-increasing control clutch. The speed-changing control arrangement is thus simplified. Use of the one-way clutch makes the speed control device simpler and smaller. With one of the clutches being a one-way clutch, a smooth transition between the speed-equalizing and -increasing modes can be achieved, and any shock upon such a mode transition is minimized. The rear drive road wheels are also prevented from being locked due to an excessive braking force from the front drive road wheels, to increase motor vehicle stability.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. A power transmitting apparatus for distributing drive power from a power unit on a four-wheel-drive motor vehicle to front and rear drive road wheels thereof, comprising:

a casing rotatable by the drive power from the power unit;

an output shaft disposed in said casing;

first and second planetary gear mechanisms disposed between said casing and said output shaft, said first and second planetary gear mechanisms comprising first and second ring gears fixed to an inner periphery of said casing, first and second sun gears aligned with said first and second ring gears, respectively, first and second planet gears meshing with said first ring and sun gears and said second ring and sun gears, respectively, and rotatable about their own axes and said ring gears, and a planet carrier coupled to said output shaft, said first and second planet gears being rotatably supported on said planet carrier, said first and second planetary gear mechanisms having different speed-changing ratios, one of said speed-changing ratios being selected such that the rear drive road wheels rotate faster than the front drive road wheels;

first and second clutches coupled respectively to said first and second sun gears, respectively, for selectively holding said first and second sun gears nonrotatable thereby to enable said first and second planetary gear mechanisms to transmit the drive power; and a pair of variable-torque-transmitting clutches coupled to respective ends of said output shaft.

2. A power transmitting apparatus according to claim 1, wherein said first and second clutches comprise clutches which can selectively be engaged and disengaged.

3. A power transmitting apparatus according to claim 1, wherein the speed-changing ratio of said first planetary gear mechanism is selected such that the front and rear drive road wheels rotate at the same speed, and the speed-changing ratio of said second planetary gear mechanism is selected such that the rear drive road wheels rotate faster than said front drive road wheels.

4. A power transmitting apparatus according to claim 3, wherein said second clutch comprises a clutch which can selectively be engaged and disengaged, and a one-way clutch disposed in series with said clutch, for connecting said second sun gear and said clutch to each other only when rotative power is applied to said second sun gear in a direction to transmit the drive power from the power unit to the rear drive road wheels.

5. A power transmitting apparatus according to claim 3, wherein said first clutch comprises a clutch which can selectively be engaged and disengaged, and a one-way clutch disposed parallel to said clutch, for holding said first sun gear nonrotatable only when rotative power is applied to said first sun gear in a direction to transmit the drive power from the front drive road wheels to the rear drive road wheels.

6. A power transmitting apparatus having a path for transmitting drive power from a power unit on a four-wheel-drive motor vehicle to rear drive road wheels thereof, comprising:

said power unit for providing rotative power, a transmission connected to the power unit for changing speed of said rotative power, a first planetary gear mechanism for transmitting rotative power from said transmission wherein a rotational speed of front drive road wheels of the motor vehicle and a rotational speed of the rear drive road wheels are substantially equal to each other;

a second planetary gear mechanism for transmitting rotative power wherein the rotational speed of the rear drive road wheels is higher than the rotational speed of the front drive road wheels;

first and second clutches coupled respectively to said first and second planetary gear mechanisms, for selectively switching said first and second planetary gear mechanisms into and out of operation; and said second clutch comprising a clutch which can selectively be engaged and disengaged, and a one-way clutch disposed in series with said clutch, for connecting said clutch and said second planetary gear mechanism to each other so that said second planetary gear mechanism can transmit drive power from the power unit to the rear drive road wheels.

7. A power transmitting apparatus according to claim 6, wherein said first clutch comprises a clutch which can be selectively engaged and disengaged, and a one-way clutch disposed parallel to said clutch for allowing said first planetary gear mechanism to transmit rotative power from the front drive road wheels to the rear drive road wheels.

* * * * *